US008001860B1

(12) United States Patent     (10) Patent No.: US 8,001,860 B1
Preston et al.     (45) Date of Patent: *Aug. 23, 2011

(54) METHOD AND APPARATUS FOR THE ALIGNMENT OF MULTI-APERTURE SYSTEMS

(75) Inventors: Dan Preston, Bainbridge Island, WA (US); David Olmstead, Bainbridge Island, WA (US)

(73) Assignee: Eagle Harbor Holdings LLC, Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,960

(22) Filed: Feb. 2, 2010

Related U.S. Application Data

(63) Continuation of application No. 12/024,058, filed on Jan. 31, 2008, now Pat. No. 7,681,448, and a continuation of application No. 10/985,577, filed on Nov. 9, 2004, now Pat. No. 7,337,650.

(51) Int. Cl.
*G01D 21/00* (2006.01)
(52) U.S. Cl. ..................................... 73/866.5
(58) Field of Classification Search ............... 73/1.38, 73/432.1, 866.5; 356/399, 400, 614, 620, 356/623, 138, 139.03, 139.1, 140, 141.1, 356/141.2, 147, 3.01, 3.1, 3.13–3.14; 250/330
See application file for complete search history.

(56) References Cited

U.S. PATENT DOCUMENTS

| 2,995,318 | A | 8/1961 | Cocharo |
|---|---|---|---|
| 4,303,978 | A | 12/1981 | Shaw |
| 4,528,563 | A | 7/1985 | Takeuchi |
| 4,591,976 | A | 5/1986 | Webber |
| 4,829,434 | A | 5/1989 | Karmel |
| 4,907,159 | A | 3/1990 | Mauge |
| 5,008,678 | A | 4/1991 | Herman |
| 5,031,330 | A | 7/1991 | Stuart |
| 5,045,937 | A | 9/1991 | Myrick |
| 5,111,401 | A | 5/1992 | Everett, Jr. |
| 5,115,245 | A | 5/1992 | Wen |
| 5,245,909 | A | 9/1993 | Corrigan |

(Continued)

FOREIGN PATENT DOCUMENTS

DE     3125161     1/1983

(Continued)

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. 18, Nov. 5, 2001, pp. 1-13.

(Continued)

*Primary Examiner* — Hezron Williams
*Assistant Examiner* — Tamiko D Bellamy
(74) *Attorney, Agent, or Firm* — Stolowitz Ford Cowger LLP

(57) ABSTRACT

A vehicle sensor system consisting of video, radar, ultrasonic or laser sensors, oriented to obtain a 360 degree view around the vehicle for the purpose of developing a situation or scene awareness. The sensors may or may not have overlapping field of views, or support the same applications, but data will be shared by all. Orientation of the sensor to the vehicle body coordinates is critical in order to accurately assess threat and respond. This system describes methods based on measuring force and rotation on each sensor and computing a dynamic alignment to first each other, then second to the vehicle.

33 Claims, 13 Drawing Sheets

Alignment of sensors and the vehicle

U.S. PATENT DOCUMENTS

| | | | |
|---|---|---|---|
| 5,287,199 A | 2/1994 | Zoccolillo | |
| 5,303,297 A | 4/1994 | Hillis | |
| 5,339,086 A | 8/1994 | DeLuca | |
| 5,341,301 A | 8/1994 | Shirai | |
| 5,438,361 A | 8/1995 | Coleman | |
| 5,471,214 A | 11/1995 | Faibish | |
| 5,506,963 A | 4/1996 | Ducateau | |
| 5,532,706 A | 7/1996 | Reinhardt | |
| 5,552,773 A | 9/1996 | Kuhnert | |
| 5,572,201 A | 11/1996 | Graham | |
| 5,581,462 A | 12/1996 | Rogers | |
| 5,585,798 A | 12/1996 | Yoshioka | |
| 5,617,085 A | 4/1997 | Tsutsumi | |
| 5,646,612 A | 7/1997 | Byon | |
| 5,749,060 A | 5/1998 | Graf | |
| 5,751,211 A | 5/1998 | Nishimura | |
| 5,761,320 A | 6/1998 | Farinelli | |
| 5,786,998 A | 7/1998 | Neeson | |
| 5,794,164 A | 8/1998 | Beckert et al. | |
| 5,872,508 A | 2/1999 | Taoka | |
| 5,907,293 A | 5/1999 | Tognazzini | |
| 5,915,214 A | 6/1999 | Reece | |
| 5,943,427 A | 8/1999 | Massie | |
| 5,948,040 A | 9/1999 | DeLorme et al. | |
| 5,951,620 A | 9/1999 | Ahrens et al. | |
| 5,959,536 A | 9/1999 | Chambers | 710/104 |
| 5,963,092 A | 10/1999 | VanZalinge | |
| 5,964,822 A | 10/1999 | Alland | |
| 5,966,658 A | 10/1999 | Kennedy, III | |
| 5,969,598 A | 10/1999 | Kimura | |
| 5,977,906 A | 11/1999 | Ameen | |
| 5,983,092 A | 11/1999 | Whinnett | |
| 5,983,161 A | 11/1999 | Lemelson | |
| 6,009,330 A | 12/1999 | Kennedy, III | |
| 6,009,403 A | 12/1999 | Sato | |
| 6,028,537 A | 2/2000 | Suman | |
| 6,028,548 A | 2/2000 | Farmer | |
| 6,032,089 A | 2/2000 | Buckely | |
| 6,054,950 A | 4/2000 | Fontana | |
| 6,060,989 A | 5/2000 | Gehlot | |
| 6,061,709 A | 5/2000 | Bronte | |
| 6,075,467 A | 6/2000 | Ninagawa | |
| 6,097,285 A | 8/2000 | Curtin | |
| 6,128,608 A | 10/2000 | Barnhill | |
| 6,148,261 A | 11/2000 | Obradovich | |
| 6,150,961 A | 11/2000 | Alewine | |
| 6,154,123 A | 11/2000 | Kleinberg | |
| 6,161,071 A | 12/2000 | Shuman | |
| 6,163,711 A | 12/2000 | Juntunen | |
| 6,166,627 A | 12/2000 | Reeley | |
| 6,167,253 A | 12/2000 | Farris | |
| 6,169,894 B1 | 1/2001 | McCormick | |
| 6,175,728 B1 | 1/2001 | Mitama | |
| 6,175,782 B1 | 1/2001 | Obradovich | |
| 6,181,922 B1 | 1/2001 | Iwai | |
| 6,181,994 B1 | 1/2001 | Colson | |
| 6,182,006 B1 | 1/2001 | Meek | |
| 6,185,491 B1 | 2/2001 | Gray et al. | |
| 6,202,027 B1 | 3/2001 | Alland | |
| 6,203,366 B1 | 3/2001 | Muller | |
| 6,204,804 B1 | 3/2001 | Andersson | |
| 6,226,389 B1 | 5/2001 | Lemelson, III | |
| 6,233,468 B1 | 5/2001 | Chen | |
| 6,236,652 B1 | 5/2001 | Preston et al. | 370/379 |
| 6,240,365 B1 | 5/2001 | Bunn | |
| 6,243,450 B1 | 6/2001 | Jansen | |
| 6,252,544 B1 | 6/2001 | Hoffberg | |
| 6,275,231 B1 | 8/2001 | Obradovich | |
| D448,366 S | 9/2001 | Youngers et al. | D14/240 |
| 6,292,109 B1 | 9/2001 | Murano | |
| 6,292,747 B1 | 9/2001 | Amro | |
| 6,294,987 B1 | 9/2001 | Matsuda | |
| 6,297,732 B2 | 10/2001 | Hsu | |
| 6,298,302 B2 | 10/2001 | Walgers | |
| 6,314,326 B1 | 11/2001 | Fuchu | |
| 6,326,903 B1 | 12/2001 | Gross | |
| 6,327,536 B1 | 12/2001 | Tsuji | |
| 6,362,748 B1 | 3/2002 | Huang | |
| 6,374,286 B1 | 4/2002 | Gee | |
| 6,377,860 B1 | 4/2002 | Gray | |
| 6,382,897 B2 | 5/2002 | Mattio | |
| 6,389,340 B1 | 5/2002 | Rayner | |
| 6,401,029 B1 | 6/2002 | Kubota | 701/201 |
| 6,405,132 B1 | 6/2002 | Breed | |
| 6,408,174 B1 | 6/2002 | Steijer | |
| 6,417,782 B1 | 7/2002 | Darnall | |
| 6,421,429 B1 | 7/2002 | Merritt | |
| 6,429,789 B1 | 8/2002 | Kiridena | |
| 6,429,812 B1 | 8/2002 | Hoffberg | |
| 6,430,164 B1 | 8/2002 | Jones et al. | |
| 6,442,485 B2 | 8/2002 | Evans | |
| 6,445,308 B1 | 9/2002 | Koike | |
| 6,452,484 B1 | 9/2002 | Drori | |
| 6,484,080 B2 | 11/2002 | Breed | |
| 6,493,338 B1 | 12/2002 | Preston et al. | 370/352 |
| 6,496,107 B1 | 12/2002 | Himmelstein | |
| 6,496,117 B2 | 12/2002 | Gutta | 340/576 |
| 6,496,689 B1 | 12/2002 | Keller | |
| 6,505,100 B1 | 1/2003 | Stuempfle | |
| 6,515,595 B1 | 2/2003 | Obradovich | |
| 6,522,875 B1 | 2/2003 | Dowling | |
| 6,559,773 B1 | 5/2003 | Berry | |
| 6,584,403 B2 | 6/2003 | Bunn | |
| D479,228 S | 9/2003 | Sakaguchi et al. | D14/253 |
| 6,614,349 B1 | 9/2003 | Proctor et al. | 340/572.1 |
| 6,615,137 B2 | 9/2003 | Lutter | |
| 6,616,071 B2 | 9/2003 | Kitamura | |
| 6,622,083 B1 | 9/2003 | Knockeart | |
| 6,629,033 B2 | 9/2003 | Preston | |
| 6,641,087 B1 | 11/2003 | Nelson | |
| 6,647,270 B1 | 11/2003 | Himmelstein | |
| 6,670,912 B2 | 12/2003 | Honda | |
| 6,675,081 B2 | 1/2004 | Shuman | |
| 6,681,121 B1 | 1/2004 | Preston et al. | 455/556.1 |
| 6,690,681 B1 | 2/2004 | Preston et al. | 370/493 |
| 6,707,421 B1 | 3/2004 | Drury et al. | |
| 6,708,100 B2 | 3/2004 | Russell | |
| 6,714,139 B2 | 3/2004 | Saito | |
| 6,725,031 B2 | 4/2004 | Watler | |
| 6,734,799 B2 | 5/2004 | Munch | |
| 6,738,697 B2 | 5/2004 | Breed | |
| 6,771,208 B2 | 8/2004 | Lutter | |
| 6,771,629 B1 | 8/2004 | Preston et al. | 370/337 |
| 6,778,073 B2 | 8/2004 | Lutter | |
| 6,778,924 B2 | 8/2004 | Hanse | |
| 6,782,315 B2 | 8/2004 | Lu | |
| 6,785,551 B1 | 8/2004 | Richard | |
| 6,792,351 B2 | 9/2004 | Lutter | |
| 6,816,458 B1 | 11/2004 | Kroon | 370/235 |
| 6,895,238 B2 | 5/2005 | Newell | |
| 6,895,240 B2 | 5/2005 | Laursen | |
| 6,901,057 B2 | 5/2005 | Rune | |
| 6,906,619 B2 | 6/2005 | Williams | 340/425.5 |
| 6,920,129 B2 | 7/2005 | Preston et al. | 370/349 |
| 6,925,368 B2 | 8/2005 | Funkhouser et al. | |
| 6,937,732 B2 | 8/2005 | Ohmura | |
| 6,952,155 B2 | 10/2005 | Himmelstein | |
| 6,972,669 B2 | 12/2005 | Saito | 340/438 |
| 6,973,030 B2 | 12/2005 | Pecen | |
| 6,993,511 B2 | 1/2006 | Himmelstein | |
| 7,000,469 B2 | 2/2006 | Foxlin | |
| 7,006,950 B1 | 2/2006 | Greiffenhagen | |
| 7,024,363 B1 | 4/2006 | Comerford | |
| 7,079,993 B2 | 7/2006 | Stephenson | |
| 7,089,206 B2 | 8/2006 | Martin | |
| 7,092,723 B2 | 8/2006 | Himmelstein | |
| 7,120,129 B2 | 10/2006 | Ayyagari | |
| 7,123,926 B2 | 10/2006 | Himmelstein | |
| 7,146,260 B2 | 12/2006 | Preston | |
| 7,151,768 B2 | 12/2006 | Preston et al. | 370/350 |
| 7,158,956 B1 | 1/2007 | Himmelstein | |
| 7,164,662 B2 | 1/2007 | Preston et al. | 370/328 |
| 7,171,189 B2 | 1/2007 | Bianconi | |
| 7,178,049 B2 | 2/2007 | Lutter | |
| 7,187,947 B1 | 3/2007 | White | |
| 7,206,305 B2 | 4/2007 | Preston et al. | 370/352 |
| 7,207,042 B2 | 4/2007 | Smith | |

| | | | |
|---|---|---|---|
| 7,215,965 B2 | 5/2007 | Fournier et al. | 455/456.1 |
| 7,221,669 B2 | 5/2007 | Preston et al. | 370/342 |
| 7,239,949 B2 | 7/2007 | Lu | |
| 7,249,266 B2 | 7/2007 | Margalit | |
| 7,257,426 B1 | 8/2007 | Witkowski | |
| 7,269,188 B2 | 9/2007 | Smith | 370/480 |
| 7,272,637 B1 | 9/2007 | Himmelstein | |
| 7,274,988 B2 | 9/2007 | Mukaiyama | |
| 7,277,693 B2 | 10/2007 | Chen | |
| 7,283,567 B2 | 10/2007 | Preston et al. | 370/493 |
| 7,283,904 B2 | 10/2007 | Benjamin et al. | 701/117 |
| 7,286,522 B2 | 10/2007 | Preston et al. | 370/352 |
| 7,317,696 B2 | 1/2008 | Preston et al. | 370/310 |
| 7,337,650 B1 * | 3/2008 | Preston et al. | 73/1.38 |
| 7,343,160 B2 | 3/2008 | Morton | |
| 7,375,728 B2 | 5/2008 | Donath | |
| 7,379,707 B2 | 5/2008 | DiFonzo | |
| 7,411,982 B2 | 8/2008 | Smith | 370/480 |
| 7,418,476 B2 | 8/2008 | Salesky | |
| 7,450,955 B2 | 11/2008 | Himmelstein | 455/456.1 |
| 7,506,020 B2 | 3/2009 | Ellis | |
| 7,508,810 B2 | 3/2009 | Moinzadeh et al. | 370/346 |
| 7,509,134 B2 | 3/2009 | Fournier et al. | 455/456.1 |
| 7,587,370 B2 | 9/2009 | Himmelstein | |
| 7,594,000 B2 | 9/2009 | Himmelstein | 709/217 |
| 7,596,391 B2 | 9/2009 | Himmelstein | |
| 7,599,715 B2 | 10/2009 | Himmelstein | |
| 7,614,055 B2 | 11/2009 | Buskens et al. | |
| 7,664,315 B2 | 2/2010 | Woodfill et al. | 382/154 |
| 7,681,448 B1 * | 3/2010 | Preston et al. | 73/432.1 |
| 7,733,853 B2 | 6/2010 | Moinzadeh et al. | 370/353 |
| 7,747,281 B2 | 6/2010 | Preston et al. | 455/577 |
| 7,848,763 B2 | 12/2010 | Fournier et al. | 455/456.1 |
| 2001/0009855 A1 | 7/2001 | L'Anson | |
| 2002/0012329 A1 | 1/2002 | Atkinson | |
| 2002/0022927 A1 | 2/2002 | Lemelson et al. | 701/301 |
| 2002/0095501 A1 | 7/2002 | Chiloyan et al. | |
| 2002/0105423 A1 | 8/2002 | Rast | |
| 2002/0144010 A1 | 10/2002 | Younis | |
| 2003/0060188 A1 | 3/2003 | Gidron | |
| 2004/0162064 A1 | 8/2004 | Himmelstein | |
| 2004/0164228 A1 | 8/2004 | Fogg | |
| 2005/0009506 A1 | 1/2005 | Smolentzov | |
| 2005/0070221 A1 | 3/2005 | Upton | |
| 2005/0130656 A1 | 6/2005 | Chen | |
| 2005/0153654 A1 | 7/2005 | Anderson | |
| 2005/0260984 A1 | 11/2005 | Karabinis | |
| 2005/0275505 A1 | 12/2005 | Himmelstein | 340/5.8 |
| 2005/0278712 A1 | 12/2005 | Buskens et al. | |
| 2007/0115868 A1 | 5/2007 | Chen | |
| 2007/0115897 A1 | 5/2007 | Chen | |
| 2008/0092140 A1 | 4/2008 | Doninger et al. | |

FOREIGN PATENT DOCUMENTS

| | | |
|---|---|---|
| DE | 4237987 | 5/1994 |
| DE | 19922608 | 11/2000 |
| DE | 19931161 | 1/2001 |
| EP | 0 441 576 A2 | 8/1991 |
| EP | 841648 | 5/1998 |
| EP | 1 355 128 | 10/2003 |
| JP | 11-273321 | 8/1999 |
| JP | 2000207691 | 7/2000 |
| WO | WO9624229 A1 | 8/1996 |
| WO | W09908436 A1 | 2/1999 |
| WO | W09957662 A2 | 11/1999 |
| WO | W09965183 A2 | 12/1999 |
| WO | WO 0029948 | 5/2000 |
| WO | WO0040038 A2 | 7/2000 |
| WO | W00130061 A1 | 4/2001 |
| WO | WO0158110 A2 | 8/2001 |

OTHER PUBLICATIONS

Ada 95 Transition Support—Lessons Learned, Sections 3, 4, and 5, CACI, Inc.—Federal, Nov. 15, 1996, 14 pages.
AMIC. Architecture specification release 1, 2001; 35 pages.
Bluetooth Doc; Advance Audio Distribution Profile Specification; Adopted version 1.0; dated May 22, 2003; 75 pages.
Bluetooth Doc; Audio/Video Remote Control Profile; Version 1.0 Adopted; dated May 22, 2003; 52 pages.
Bluetooth Hands-free Profile 1.5 Nov. 25, 2005.
Bluetooth Specification version 1.1; Feb. 22, 2001; 452 pages.
Boeing News Release, "Boeing Demonstrates JSF Avionics Multi-Sensor Fusion", Seattle, WA, May 9, 2000, pp. 1-2.
Boeing Statement, "Chairman and CEO Phil Condit on the JSF Decision", Washington, D.C., Oct. 26, 2001, pp. 1-2.
Counterair: The Cutting Edge, Ch. 2 "The Evolutionary Trajectory the Fighter Pilot—Here to Stay?" AF2025 v3c8-2, Dec. 1996, pp. 1-7.
Counterair: The Cutting Edge, Ch. 4 "The Virtual Trajectory Air Superiority without an "Air" Force?" AF2025 v3c8-4, Dec. 1996, pp. 1-12.
Embedded Bluetooth Migrates to Lisbon and Seattle; 11 pages; Jan. 23, 2008.
Green Hills Software, Inc., "The AdaMULTI 2000 Integrated Development Environment," Copyright 2002, printed Jul. 9, 2002; 7 pages.
H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, 2001, pp. 1-6.
Hitachi Automated Highway System (AHS), Automotive Products, Hitachi, Ltd., Copyright 1994-2002, 8 pages.
IEEE Standard for Information Technology—POSIX Based Supercomputing Application Environment Profile; Jun. 14, 1995, 72 pages.
ISIS Project: Sensor Fusion, Linkoping University Division of Automatic Control and Communication Systems in cooperation with SAAB (Dynamics and Aircraft), 2001, 18 pages.
J. Takezaki, N. Ueki, T. Minowa, H. Kondoh, "Support System for Safe Driving—A Step Toward ITS Autonomous Driving—", Hitachi Review, vol. 49, Nov. 3, 2000, pp. 1-8.
Joint Strike Fighter Terrain Database, ets-news.com "Simulator Solutions" 2002, 3 pages.
Luttge, Karsten; "E-Charging API: Outsource Charging to a Payment Service Provider"; IEEE; 2001 (pp. 216-222).
M. Chantler, G. Russel, and R. Dunbar, "Probabilistic Sensor Fusion for Reliable Workspace Sensing", Fourth IARP workshop on Underwater Robotics, Genoa, Nov. 1992, pp. 1-14.
MSRC Redacted Proposal, 3.0 Architecture Development, Aug. 29, 2002; pp. 1-43.
MyGig User Guide.
Powerpoint Presentation by Robert Allen—Boeing Phantom Works entitled "Real-Time Embedded Avionics System Security and COTS Operating Systems", Open Group Real-Time Forum, Jul. 18, 2001, 16 pages.
Product description of Raytheon Electronic Systems (ES), Copyright 2002, pp. 1-2.
Product description of Raytheon RT Secure, "Development Environment", Copyright 2001, pp. 1-2.
Product description of Raytheon RT Secure, "Embedded Hard Real-Time Secure Operating System", Copyright 2000, pp. 1-2.
Product description of Raytheon RT Secure, Copyright 2001, pp. 1-2.
S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.
Specification of the Bluetooth System v1.0.B; Dec. 1, 1999.
Specification of the Bluetooth System v1.1; Feb. 22, 2001.
TNO FEL Annual Review 1998: Quality works, Observation Systems Division; "The Whole is More Than the Sum of its Parts"; 16 pages.
Vehicle Dynamics Lab, University of California, Berkeley, funded by BMW, current members: D. Caveney and B. Feldman, "Adaptive Cruise Control", at least as early as 2002, printed Jul. 2, 2002; 17 pages.
Stirling A: "Mobile Multimedia platforms" Vehicular Technology Conferene Fall 2000. IEEE VTS Fall VTC2000. 52nd Vehicular Technology Conference (Cat. No. 00CH37152).

Nusser R. et al.: "Bluetooth-based wireless connectivity in an automotive environment" Vehicular Technoloty Conference Fall 2000. IEEE VTS Fall VTC2000 52nd Vehicular Techonlogy Conference (Cat. No. 00CH37152).

Martins e f v et al. "Design of an OS9 operating system extension for a message-passing multiprocesor" Microprocessors and Microsysetms, IPC Business Press LT. London, BG, vol. 21, No. 9, Apr. 1, 1998, pp. 533-543.

Gutierrez Garcia JJ et al. "Minimizing the effects of jitter in distributed hard real-time systems" Journal of Systems Architecture, Elsevier Science Publishers BV., Amsterdam, NL, vol. 41, No. 6/7. Dec. 15, 1996, pp. 431-447.

International Search Report for PCT/US02/020402; Mailing date Apr. 3, 2003.

International Search Report for PCT/US02/020403; Mailing date Jan. 27, 2003.

International Search Report for PCT/US02/016364; Mailing date Feb. 14, 2003.

International Search Report for PCT/US02/016371; Mailing date Aug. 18, 2003.

Stolowitz Ford Cowger LLP Listing of Related Cases; May 10, 2010.
Stolowitz Ford Cowger LLP, Listing of Related Cases, Jan. 10, 2010.
Stolowitz Ford Cowger LLP, Listing of Related Cases, Jan. 24, 2011.
Stolowitz Ford Cowger LLP, Listing of Related Cases, Feb. 6, 2011.
Stolowitz Ford Cowger LLP, Listing of Related Cases, Mar. 15, 2011.
Stolowitz Ford Cowger LLP Listing of Relate Cases for U.S. Appl. No. 12/698,960; Dec. 17, 2010.

* cited by examiner

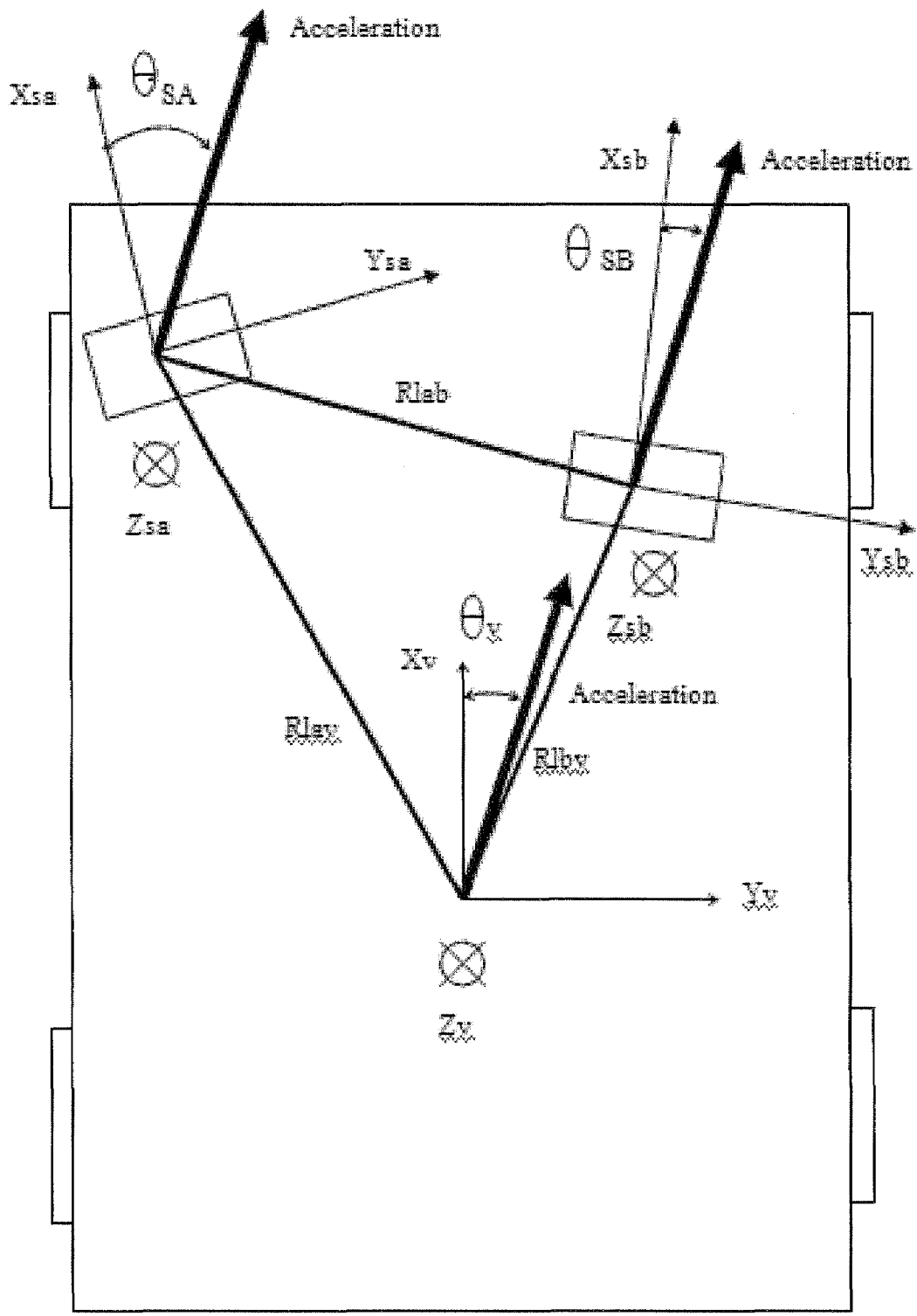
Figure 1: Alignment of sensors and the vehicle

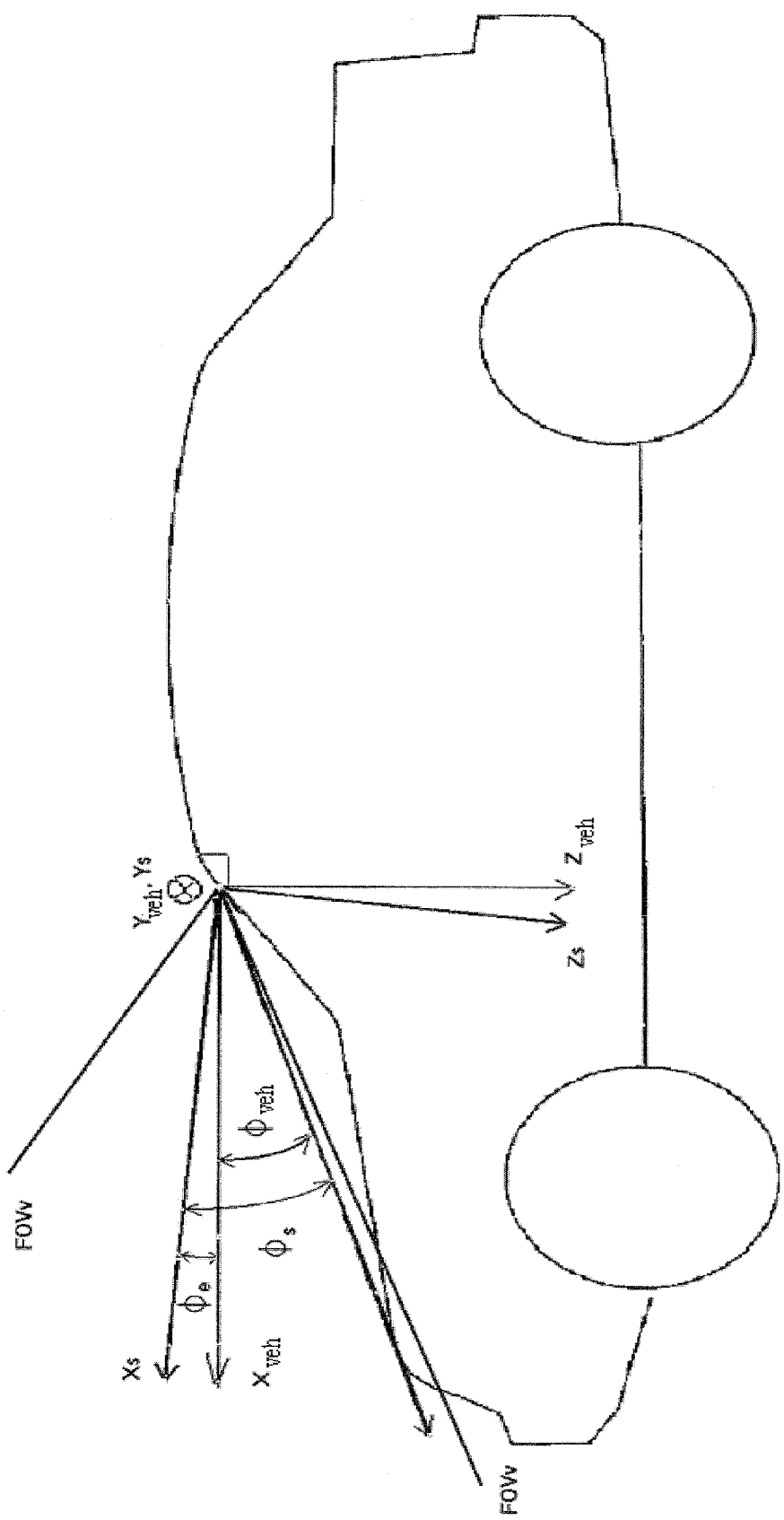
Figure 2: Pitch misalignment Angle Computation

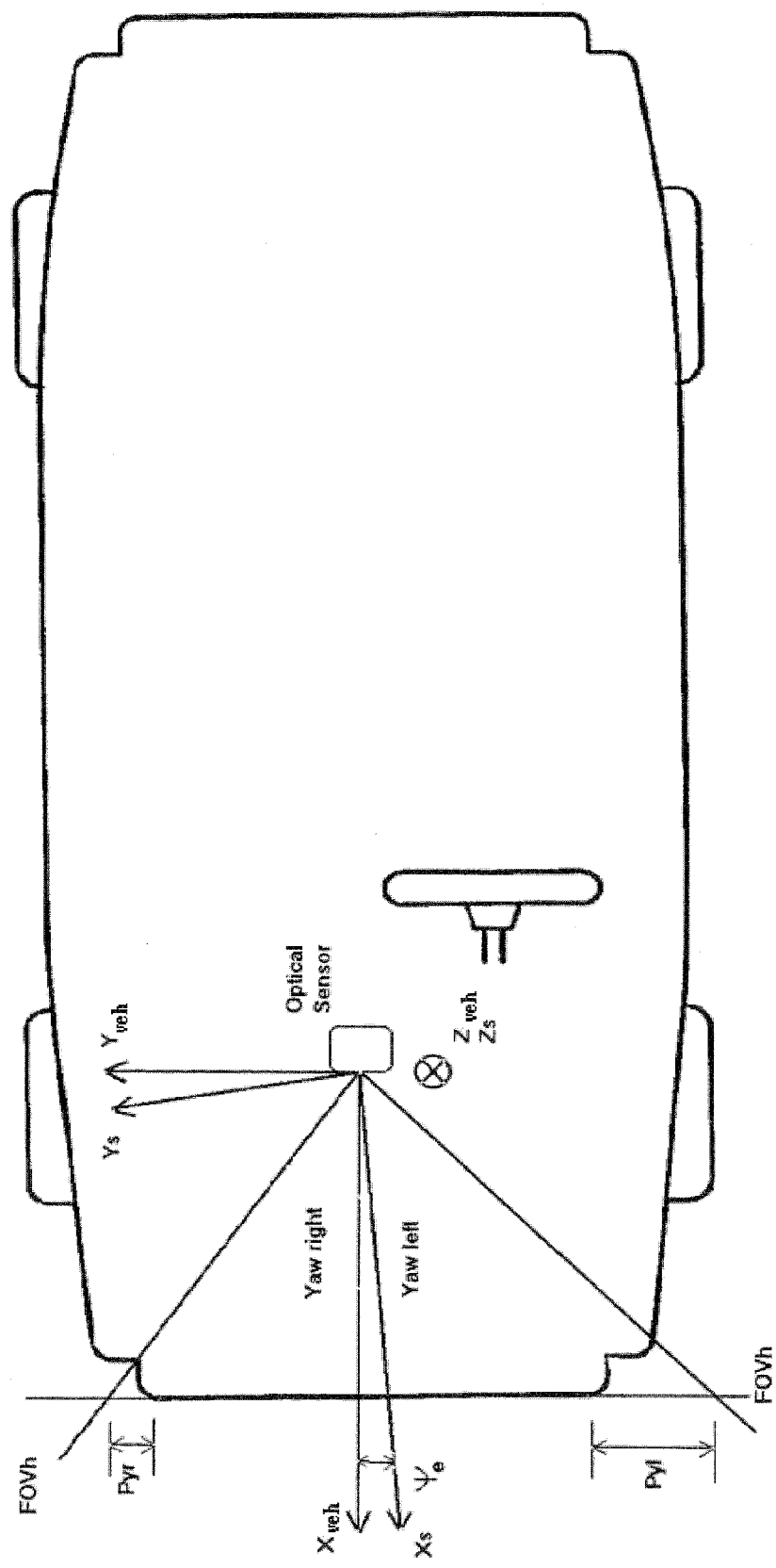
Figure 3: Yaw Misalignment Angle Computation

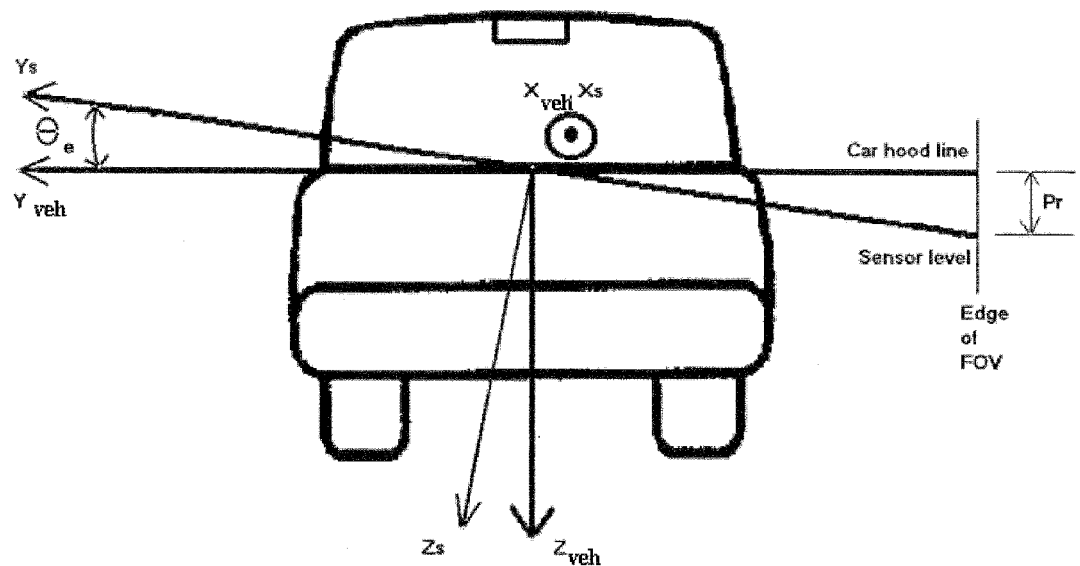
Figure 4: Roll misalignment Angle Computation
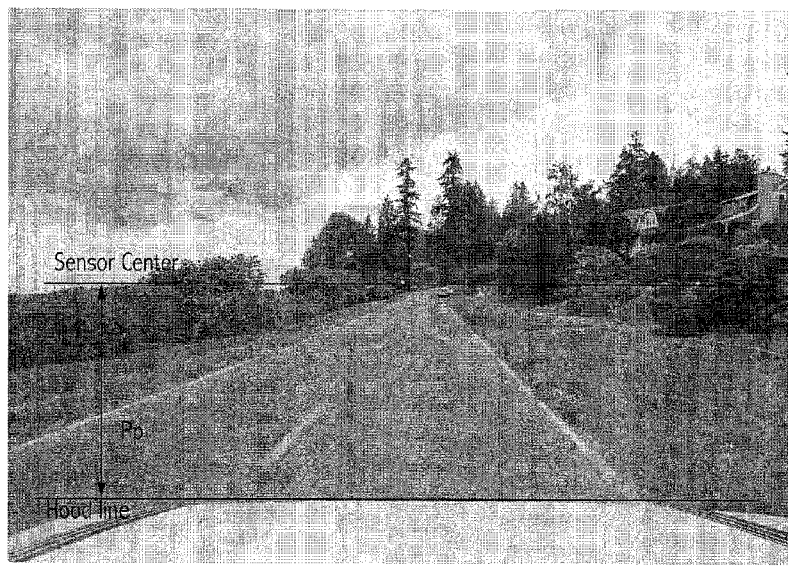
Figure 5: Optical Image – Level

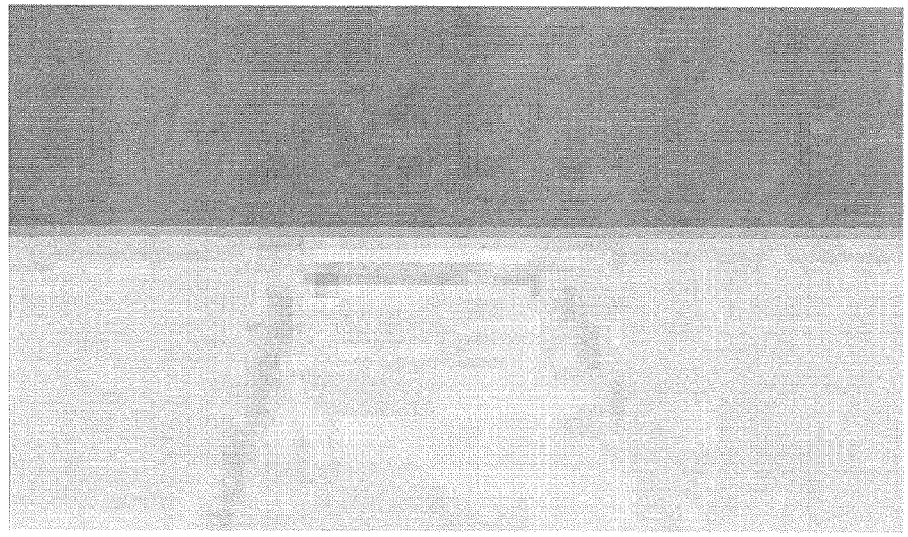
Figure 6: Center of Hood, level, magnified 12 times
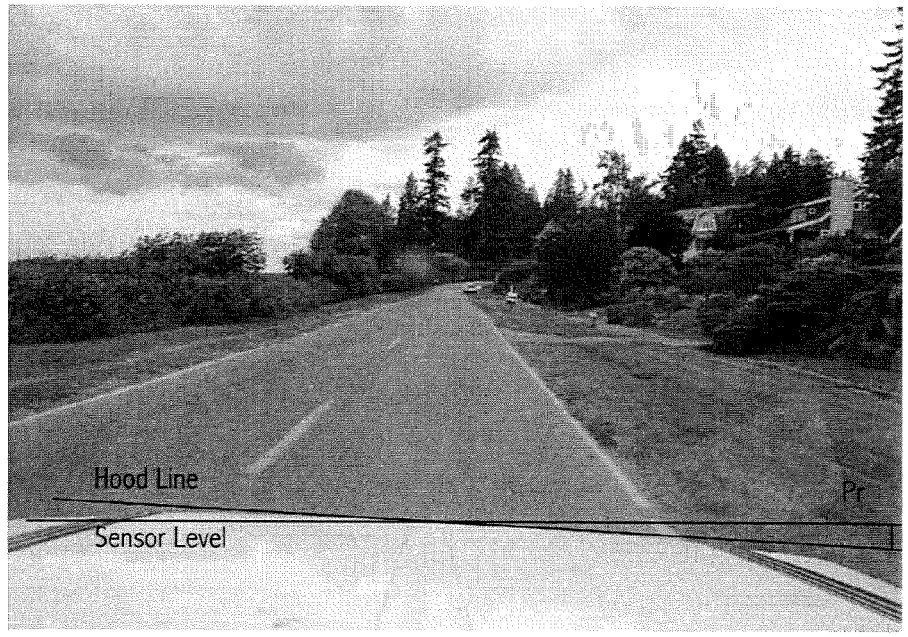
Figure 7: Optical Image – Banked left

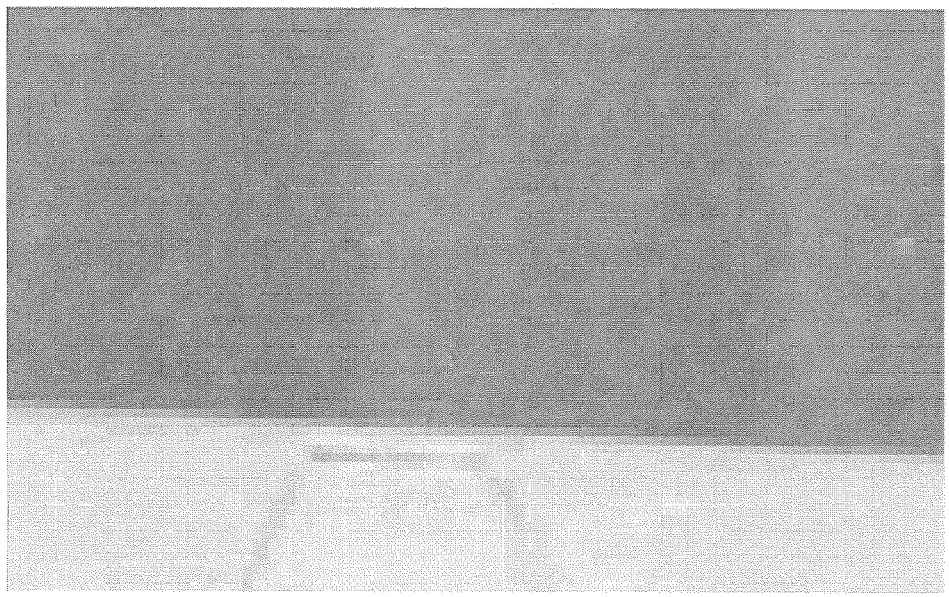
Figure 8: Center of Hood, banked left, magnified 8 times
Figure 9: Optical Image – Yaw left

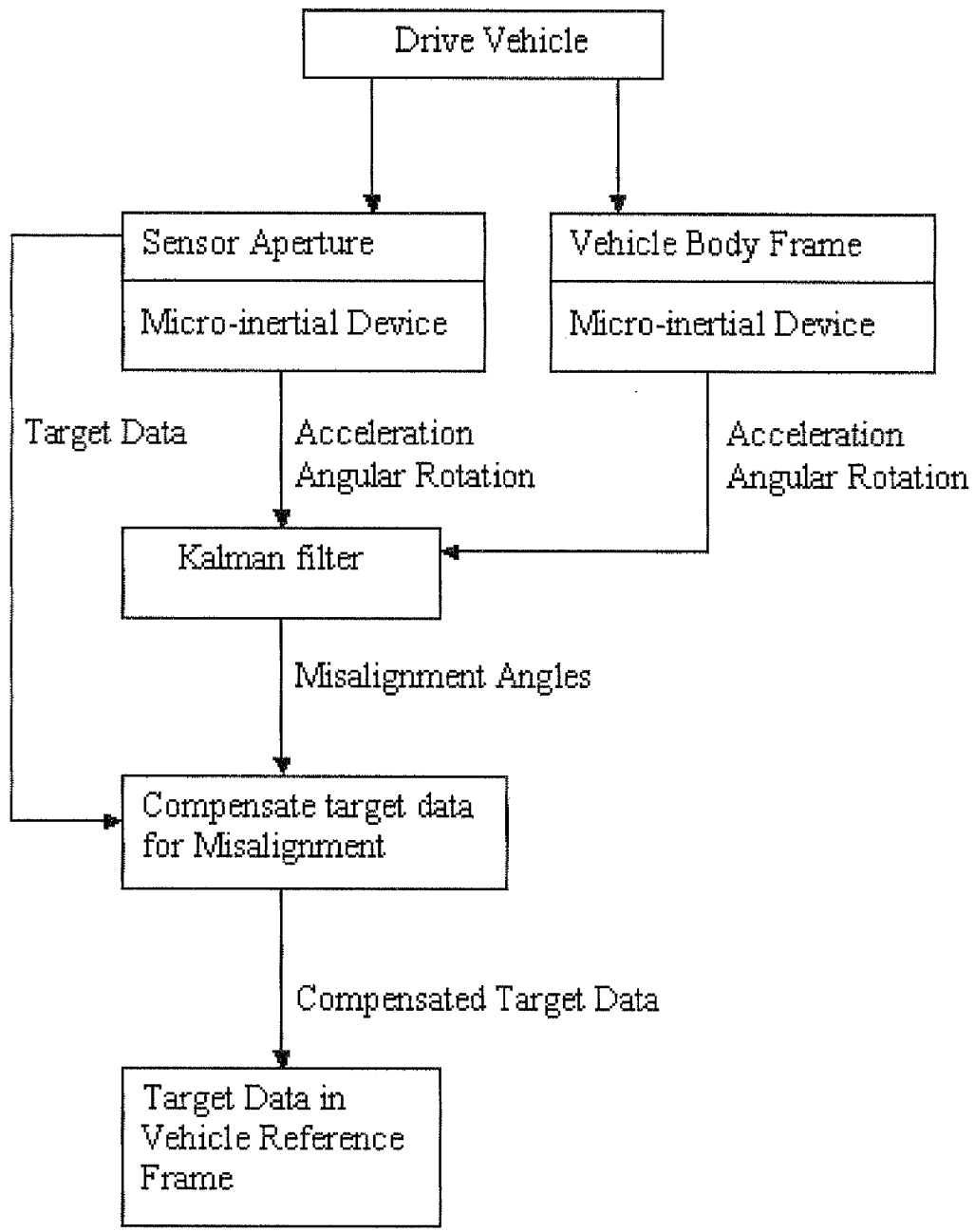
Figure 10: Alignment where all sensors have micro-inertials

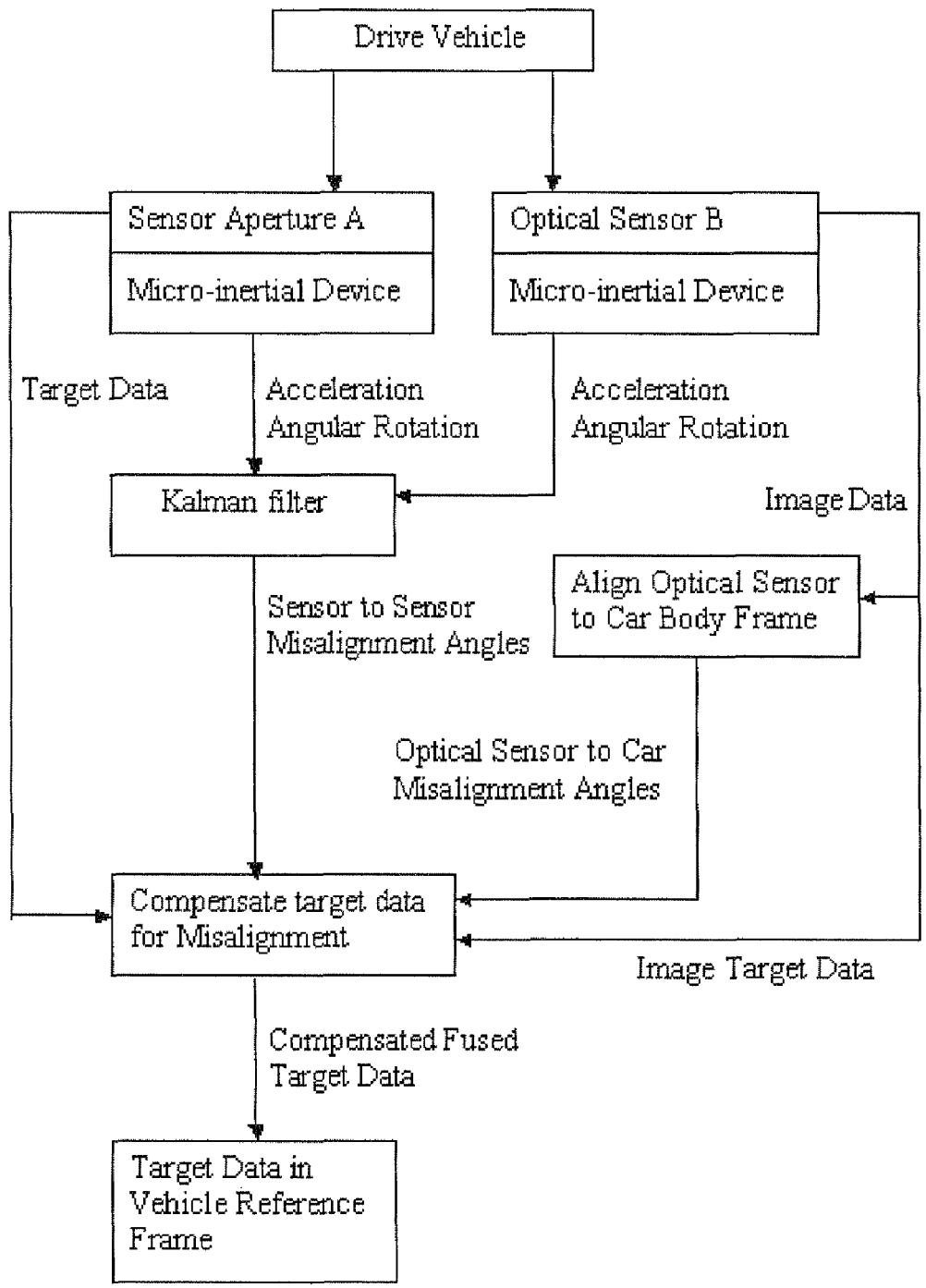
Figure 11: Alignment using micro-inertials and an optical sensor

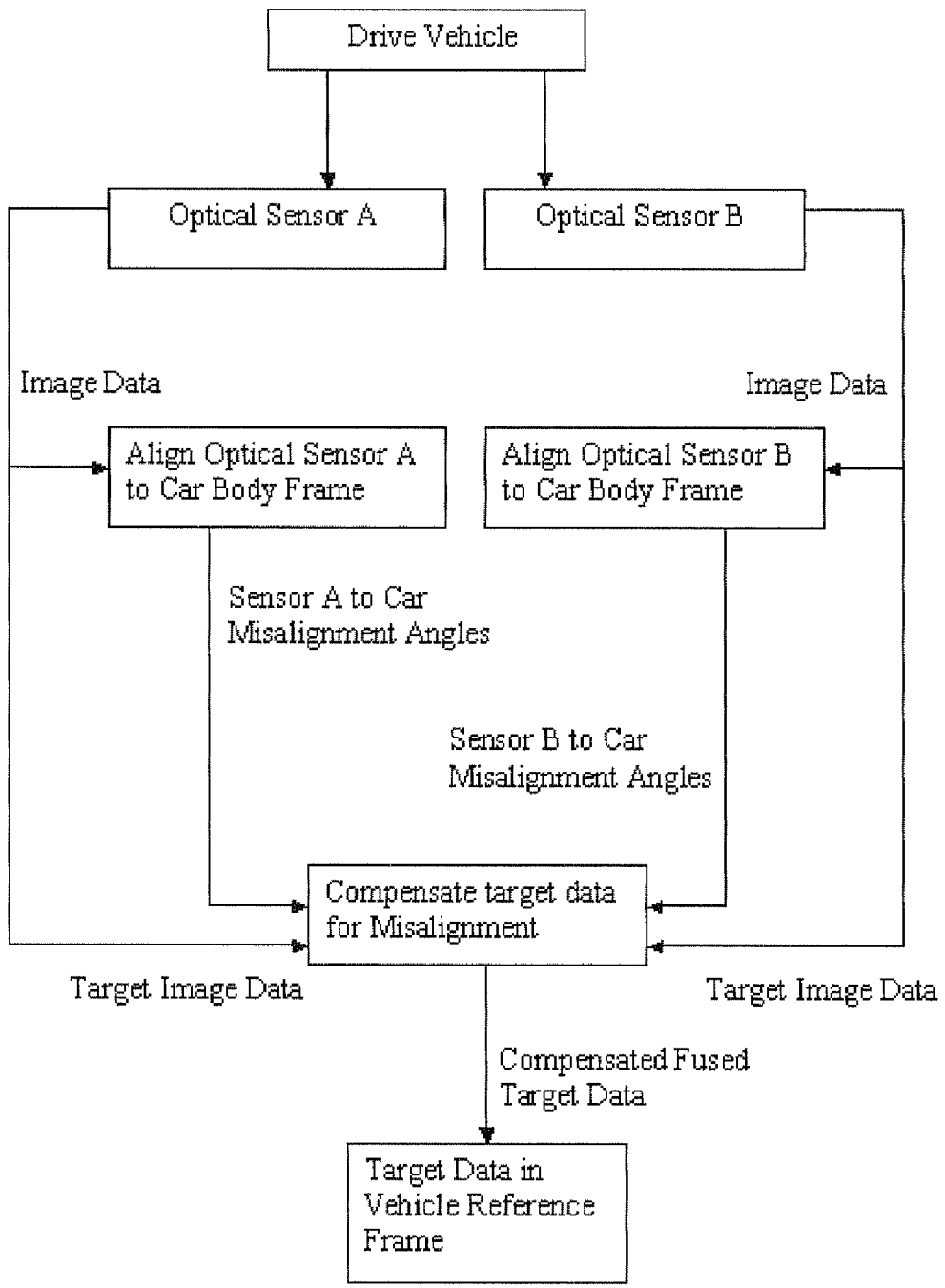
Figure 12: Alignment where all of the sensors are optical

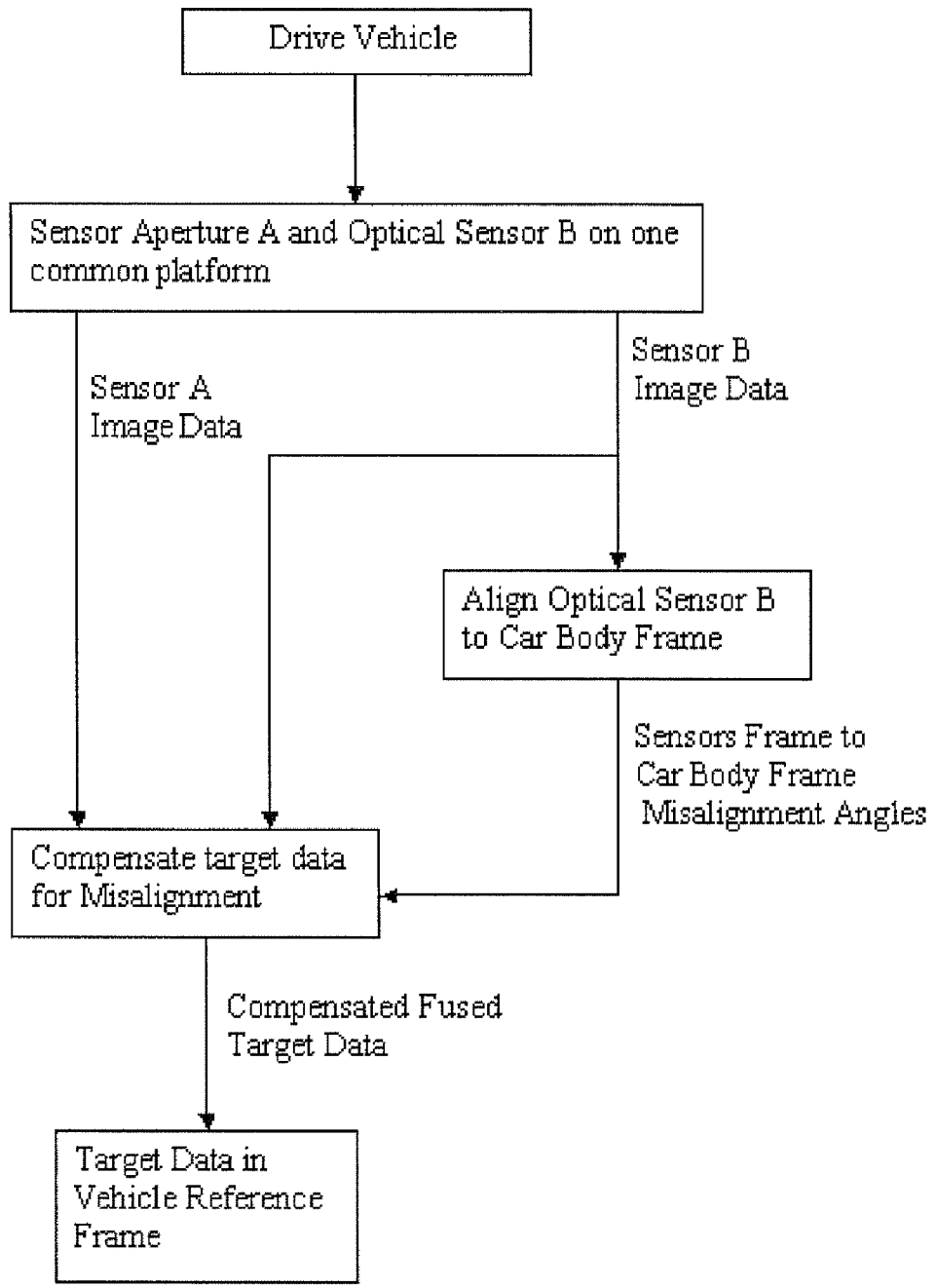
Figure 13: Alignment where the sensors are on a common platform

METHOD AND APPARATUS FOR THE ALIGNMENT OF MULTI-APERTURE SYSTEMS

RELATED FILINGS

This application is a continuation of U.S. patent application Ser. No. 12/024,058, filed Jan. 31, 2008, the disclosure of which is incorporated herein by reference in its entirety and further incorporates by reference: U.S. Pat. No. 7,337,650, Issued Mar. 4, 2008 Titled—SYSTEM AND METHOD FOR ALIGNING SENSORS ON A VEHICLE; U.S. Pat. No. 6,629,033, Issued Sep. 30, 2003 Titled—OPEN COMMUNICATION SYSTEM FOR REAL-TIME MULTIPROCESSOR APPLICATIONS, U.S. Pat. No. 6,771,208, Issued Aug. 3, 2004 Titled—MULTI SENSOR SYSTEM, and U.S. patent application Ser. No. 09/841,915, filed Apr. 24, 2001 entitled: METHOD AND APPARATUS FOR DYNAMIC CONFIGURATION OF MULTIPROCESSOR SYSTEM.

Applicants believe the above-incorporated material constitutes "essential material" within the meaning of 37 CFR 1.57(c)(1)-(3), applicants have amended the specification to expressly recite the essential material that is incorporated by reference as allowed by the applicable rules.

REFERENCES CITED

U.S. Patent Documents U.S. Pat. No. 5,245,909 May 7, 1990; Title: Automatic Sensor Alignment; Inventors: Corrigan; John D. (Bridgeton, Mo.); Simmons, Jr.; Dennis E. (St. Louis, Mo.); Berg; Robert L. (St. Louis, Mo.); Assignee: McDonnell Douglas Corporation (MD) U.S. Pat. No. 6,202,027 Mar. 13, 2001; Title: Automatic curve sensor calibration method for an automotive CW/ICC system; Automatic curve sensor calibration method for an automotive CW/ICC system U.S. Pat. No. 5,031,330 Jul. 16, 1991; Title: Electronic Boresight; Inventors: Stuart; Kenneth (Los Altos Hills, Calif.) Assignee: Kaiser Aerospace & Electronics Corporation (Oakland, Calif.)

Other References Product description of Raytheon RT Secure, "Embedded Hard Real-Time Secure Operating System", Copyright 2000, pp. 1-2. Product description of Raytheon RT Secure, Copyright 2001, pp. 1-2. Product description of Raytheon RT Secure, "Development Environment", Copyright 2001, pp. 1-2. Product description of Raytheon Electronic Systems (ES), Copyright 2002, pp. 1-2. H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21-26, pp. 1-6. A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13. J. Takezaki, N. Ueki, T. Minowa, H. Kondoh, "Support System for Safe Driving—A Step Toward ITS Autonomous Driving-", Hitachi Review, vol. 49, No. 3, 2000, pp. 1-8. S. G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, N.C., 1997, pp. 1-5. M. Chantler, G. Russel, and R. Dunbar, "Probabilistic Sensor Fusion for Reliable Workspace Sensing", pp. 1-14. ISIS Project: Sensor Fusion, Linkoping University Division of Automatic Control and Communication Systems in cooperation with SAAB (Dynamics and Aircraft), 18 pp. Hitachi Automated Highway System (AHS), Automotive Products, Hitachi, Ltd., Copyright 1994-2002, 8 pages. Vehicle Dynamics Lab, University of California, Berkeley, funded by BMW, current members: D. Caveney and B. Feldman, "Adaptive Cruise Control", 17 pages. Counterair: The Cutting Edge, Ch. 2 "The Evolutionary Trajectory The Fighter Pilot-Here to Stay?" AF2025 v3c8-2, December 1996, pp. 1-7. Counterair: The Cutting Edge, Ch. 4 "The Virtual Trajectory Air Superiority without an "Air" Force?" AF2025 v3c8-4, December 1996, pp. 1-12. TNO FEL Annual Review 1998: Quality works, 16 pages. Boeing News Release, "Boeing Demonstrates JSF Avionics Multi-Sensor Fusion", Seattle, Wash., May 9, 2000, pp. 1-2. Ada 95 Transition Support—Lessons Learned, Sections 3, 4, and 5, CACI, Inc.—Federal, Nov. 15, 1996, 14 pages. Joint Strike Fighter Terrain Database, ets-news.com "Simulator Solutions" 2002, 3 pages. MSRC Redacted Proposal, 3.0 Architecture Development, pages 1-43. Powerpoint Presentation by Robert Allen—Boeing Phantom Works entitled "Real-Time Embedded Avionics System Security and COTS Operating Systems", Open Group Real-Time Forum, Jul. 18, 2001, 16 pages. Green Hills Software, Inc., "The AdaMULTI 2000 Integrated Development Environment", Copyright 2002, 7 pages

BACKGROUND

Next generation automotive systems such as Lane Departure Warning (LDW), Collision Avoidance (CA), Blind Spot Detection (BSD) or Adaptive Cruise Control (ACC) systems will require target information from multiple sensors including a new class of sensor called sensor apertures such as radar, image or laser, similar to those found on advanced tactical fighter aircraft. For example, one sensor aperture may be located on the front bumper of the vehicle and obtains range and azimuth information about vehicles and stationary objects in front of the vehicle. Another sensor aperture may be located on the dash of the vehicle and obtains image information about vehicles and stationary objects in front of the vehicle. Another sensor aperture may be located on the side of the vehicle and obtains either range and azimuth data or image data in order to determine velocity and track information on vehicles that pass the vehicle. These new systems must take all of the information from the multiple sensors apertures on the vehicle and compute an accurate picture of the moving objects around the vehicle; this is known as kinematic state of the targets, or Situation Awareness (SA). To do this the Situation Awareness Platform (SAP) must accurately align the sensors apertures to each other so that information about a target from one sensor aperture can be used with information about the target from a different sensor aperture. This is called Sensor Fusion (SF), this is necessary for the SAP to get an optimal kinematic state of the targets around the vehicle in order to assess threat. The sensor apertures must also be aligned to the body of the vehicle so that the SAP can determine the position and velocity of the target with respect to the vehicle; this is called Navigation Fusion (NF).

One method of aligning the sensors apertures to each other and to the vehicle is to use mechanical and optical instruments, such as auto-collimators and laser boresight tools, during the production of the vehicle. This technique is not only costly, but would be require if a sensor aperture were repaired or replaced after production. An alignment procedure would have to be performed again in order to assure the safety critical systems were reporting accurately. Also as the vehicle goes through normal wear and tear the sensor apertures would start to become misaligned and may not be noticed by the operator. This means that the data from the sensor apertures would not correlate with each other and the vehicle reference frame until the sensor apertures were aligned again. Again, this would be costly to the vehicle operator and until performed, the SAP may not provide accurate data. Therefore, a method to align the sensor apertures to each other and to the vehicle without the use of sophisticated optical tools is required. This patent addresses this problem by describing methods that can be used to align the sensor apertures to each other and to the vehicle that do not require external alignment equipment.

In a discussion of Prior Art, U.S. Pat. No. 5,245,909, Automatic Sensor Alignment, relates to systems for maintaining alignment-sensitive aircraft-borne avionics and weapons sensors in precise alignment. It further relates to methods for precisely aligning sensitive avionics for weapons system instrumentation, which is subject to vibrations causing misalignment. Whereas this disclosure relates to methods and systems that support advanced automotive systems not described in the prior art. A second key difference is the reliance of sensor data from the vehicle as part of the alignment method. Another difference is using image apertures with elements of the vehicle in the field of view of the imager and employing optical methods for determining changes to the alignment with respect to the vehicle and vehicle reference frame, then applying a compensation based on the misalignment angle measured. Finally, this system described herein does not require a reliance on boresighting and aligning any sensor to achieve a vehicle reference frame.

U.S. Pat. No. 6,202,027, Automatic Curve Sensor Calibration, describes an improved system for accurately determining the travel path of a host vehicle and the azimuth angle of a target vehicle through an automatic calibration that detects and compensates for misalignment and curve sensor drift. The difference is a reliance on observed objects and track file generation and subsequent changes to the track files over time. Whereas this patent teaches methods of alignment based force vectors, rotational rates or optically measured changes with respect to the vehicle reference frame. Essentially all observed objects are compensated for misalignment error on the observing vehicle.

U.S. Pat. No. 5,031,330, Electronic Boresight, teaches that pairs of level sensing devices can be used in a method that aligns plane surfaces to one another by tilting platforms equal to the amount misalignment measured to adjust the sensor azimuth. Whereas this patent teaches that the sensor apertures are rigidly mounted to the vehicle and correction to misalignment is done by compensation values observed with respect to the vehicle reference frame.

Different sensors can be used in vehicles to identify objects and possible collision conditions. For example, there may be an optical sensor, such as a camera, mounted to the roof of the vehicle. Another Infrared (IR) sensor may be mounted in the front grill of the vehicle. A third inertial sensor may be located in yet another location in the central portion of the vehicle. Data from these different sensors is correlated together to identify and track objects that may come within a certain vicinity of the vehicle.

The measurements from the different sensors must be translated to a common reference point before the different data can be accurately correlated. This translation is difficult because the sensors are positioned in different locations on the vehicle. For example, the sensor located inside the front bumper of the vehicle may move in one direction during a collision while the sensor located on the top of the vehicle roof may move in a different direction.

One of the sensors may also experience vibrations at a different time than the other sensor. For example, the front bumper sensor may experience a vertical or horizontal movement when the vehicle runs over an obstacle before any movements or vibrations are experienced by the roof sensor. This different movements of sensors relative to each other make is very difficult to accurately determine the precise position and orientation of the sensors when the sensor readings are taken. This makes it difficult to translate the data into common reference coordinates.

The present invention addresses this and other problems associated with the prior art.

SUMMARY OF THE INVENTION

A vehicle sensor system configured to gather sensory data 360 degrees around the vehicle, comprising of sensor apertures for gathering data such as: range (e.g. ultrasonic); range and azimuth (e.g. laser and/or radar); images (e.g. optical and/or thermal). The vehicle has sensors that align and establish a vehicle reference frame by measuring body yaw, pitch and roll rates as well as acceleration along the 3 axes of the vehicle. The imaging apertures that have a clear view of body mold lines, like hood or rear deck, will align themselves to the vehicle reference frame, those apertures that can not align using optical methods are aligned to the vehicle using accelerometers and rates sensors by reading the inertial acceleration or angular rotation to align themselves to each other. An Integrated Computing Platform (ICP) hosts the SAP software that maintains complete system alignment by determining differences in alignment and applying or updating a compensation value with respect to the vehicle body coordinates resulting in a dynamically boresighted system.

A multi-sensor system includes multiple sensors that are integrated onto the same substrate forming a unitary multi-sensor platform that provides a known consistent physical relationship between the multiple sensors. A processor can also be integrated onto the substrate so that data from the multiple sensors can be processed locally by the multi-sensor system.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a diagram showing how a common inertial acceleration is sensed by accelerometers on each sensor and can be used to align the sensor coordinate frames.

FIG. 2 is a diagram showing the pitch angles used to determine the pitch misalignment angle of the optical sensor.

FIG. 3 is a diagram showing the yaw data that is used to determine the yaw misalignment angle of the optical sensor.

FIG. 4 is a diagram showing the roll data that is used to determine the roll misalignment angle of the optical sensor.

FIG. 5 is an image showing the top of the hood and how it is used to compute the pitch misalignment angle.

FIG. 6 is a magnified image of the hood line showing the pixels of the image.

FIG. 7 is an image showing the top of the hood and how it is used to compute the roll misalignment angle.

FIG. 8 is a magnified image of the banked hood line showing the pixels of the image.

FIG. 9 is an image showing the top of the hood and how it is used to compute the yaw misalignment angle.

FIG. 10 is a flow chart that shows the alignment process when all sensors have micro-inertials.

FIG. 11 is a flow chart that shows the alignment process when using micro-inertials and an optical sensor.

FIG. 12 is a flow chart that shows the alignment process when all of the sensors are optical.

FIG. 13 is a flow chart that shows the alignment when the sensors are on a common platform.

DETAILED DESCRIPTION

Figure 14:
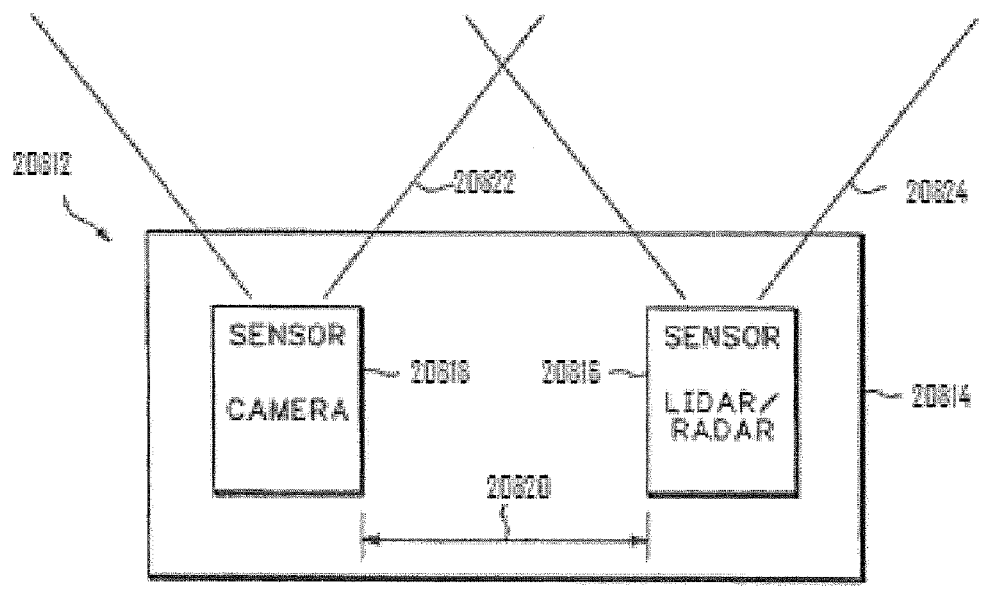
FIG. 14 is a block diagram of a multi-sensor system.
Figure 15:
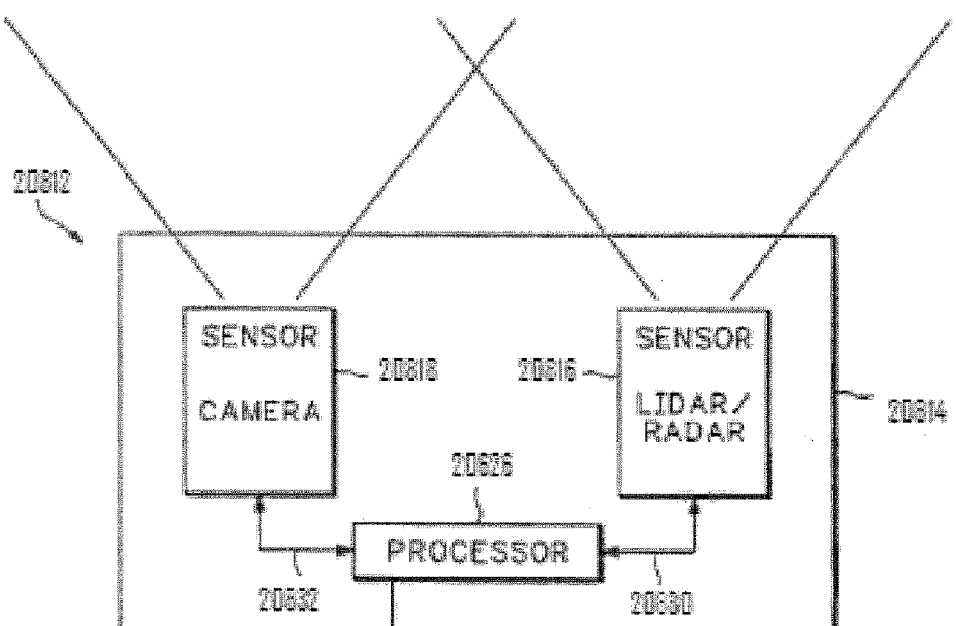
FIG. 15 is a block diagram of an alternate embodiment of the multi-sensor system that includes an on-board processor.

One method is to attach three axis accelerometers to each sensor and to the vehicle and use gravity and the acceleration of the vehicle, which will be sensed by the accelerometers, to align the sensor axes to each other and to the vehicle. Information from the vehicle that is available on the Car Area Network (CAN) bus will also be used to perform the calculation of the misalignment angles. FIG. 1 shows in two dimensions the relation between sensor aperture A frame, sensor aperture B frame and the vehicle body reference frame. There are two accelerometers that sense acceleration in the X and Y axes of the sensor apertures and vehicle. This problem can easily be expanded to three dimensions with another accelerometer located in the Z-axes of each sensor and vehicle.

In FIG. 1 the vehicle experiences a linear acceleration and this common acceleration is observed by the accelerometers located on sensor aperture A, sensor aperture B and the vehicle body. The accelerometers that are attached to the vehicle body are aligned to the vehicle body reference frame. By taking the difference in acceleration data from the accelerometers on sensor aperture A and sensor aperture B and inputting this data in a Kalman Filter, the misalignment angle between the two sensor apertures, .theta.sa-.theta.sb, can be computed. The same can be done between sensor aperture A and the vehicle body, and sensor aperture B and the vehicle body to compute all of the misalignment angles. This approach can be used to compute the three dimensional misalignment angles of roll, pitch and yaw between sensor apertures and the vehicle body reference frame.

The same approach can be used when the vehicle is turning and each accelerometer group experiences a centripetal acceleration. However, in this case the difference in accelerations must be compensated by the centripetal acceleration resulting from the lever arm vector between the two sensor apertures and the angular rotation of the vehicle. The angular rotation of the vehicle is sensed by a gyro triad or micro-inertial device located at the vehicle body reference frame Acomp=Asensora-wxwxR1 The input to the Kalman filter is now: Acomp-Asensorb where: Asensora is the acceleration measured by sensor A accelerometers Asensorb is the acceleration measured by sensor B accelerometers w is the angular rotation of the vehicle measured by the ref gyros x is the cross product of two vectors R1 is the lever arm vector between sensor A and sensor B Acomp is the sensor acceleration compensated for lever arm rotation Also if the vehicle is stationary, the accelerometer groups will sense gravity and this can be used to help compute some of the misalignment angles. Information from the vehicle CAN bus, such as wheel rotation speeds are zero, will tell the Kalman filter that the vehicle is not moving and the only sensed acceleration will be from gravity.

FIG. 10 is a flow chart showing the process when all of the sensor apertures, as well as the vehicle body, have a micro-inertial attached to them. When the vehicle is moving, the micro-inertials sense the angular rotation and/or acceleration of the vehicle and this information is the input to a Kalman filter. The filter uses this information to estimate the roll, pitch and yaw misalignment angles between a sensor aperture and the vehicle body frame. These misalignment angles are then used to rotate the sensor target data into the vehicle body frame. With all of the target data in a common reference frame the processor can fuse data from several sensors into an optimal target track file.

The second method is to use accelerometers to align the sensor apertures to each other and one of the sensor apertures is aligned to the vehicle body by using optical information from the sensor aperture itself. For example, acceleration data can be used to align sensor aperture A to sensor aperture B, but sensor aperture B is aligned to the vehicle body directly by using sensor aperture B to compute the misalignment angles between sensor aperture B and the vehicle body. Since sensor aperture A is aligned to sensor aperture B and sensor aperture B is aligned to the vehicle body, you can compute the misalignment between sensor aperture A and the vehicle body. Sensor aperture B can be a visual sensor aperture, such as a video camera, and by observing the outline of the hood and body of the vehicle using this camera, you can compute the misalignment angles between sensor aperture B and the vehicle body frame.

FIG. 2 shows that the pitch misalignment angle is the angle between the sensor aperture's X-axis and vehicle's X-axis in the vertical plane. The pitch angle between the vehicle X-axis and a line from the sensor aperture to the top point of the hood, .PHI.vehicle, can be computed from the vehicle's dimensions. The image from the sensor aperture, FIG. 5 for example, shows the top of the hood. By counting the pixels from the center of the image down to the hood, Pp, the sensor aperture pitch angle can be computed. Using a 480.times.640 pixel image, this angle can be computed to within 1 pixel, see FIG. 6. With a vertical field of view, FOVv, the pitch angle is: .PHI.s=(Pp/480)*FOVv The pitch misalignment angle is: .PHI.misalign=.PHI.s-.PHI.vehicle FIG. 3 shows that the small yaw misalignment angle is the angle between the sensor aperture's X axis and vehicle's X axis in the horizontal plane. The sensor aperture image shows the left and right edges of the hood, FIG. 9. By computing the pixels from the left hood edge or mark on the hood to the left of the image border, Pyl, and the right hood edge or mark to the right border, Pyr, the yaw angle of the sensor aperture misalignment with a horizontal field of view, FOVh is: .PSI-.Misalign=((Pyl-Pyr)/2*640)*FOVh FIG. 4 shows that the small roll misalignment angle is the angle between the sensor aperture's Y-axis and vehicle's Y-axis in the vertical plane. The sensor aperture image shows that the hood line and the sensor aperture level lines cross to form the roll misalignment angle. This is shown in FIG. 7. By measuring the pixels between the two lines at the edge of the image, Pr, the roll misalignment angle can be computed as follows: .THETA.Misalign=(2*Pr/640)*180/.pi. FIG. 8 shows that the hood line can be determined accurately to within a couple of pixels.

FIG. 11 is a flow chart showing the process when at least one of the sensors is an optical device. All of the sensors have a micro-inertial attached to them. The optical device can see the targets and the outline of features of the vehicle, such as the hood line. The optical sensor uses the hood line information to compute the roll, pitch and yaw misalignment angles between the optical sensor frame and the vehicle body frame.

When the vehicle is moving, the micro-inertials sense the angular rotation and/or acceleration of the vehicle. Like FIG. 10, the Kalman filter estimates the roll, pitch and yaw misalignment angles between a sensor aperture frame and the optical sensor frame. These misalignment angles as well as the misalignment angles between the optical sensor and the vehicle body frame are then used to rotate all of the sensor target data into the vehicle body frame. Again, with all of the target data in a common reference frame the processor can fuse data from several sensors into an optimal target track file.

A third method is to use optical information from sensor aperture A and sensor aperture B to compute the misalignment between the two sensor apertures and to use optical information from sensor aperture B to compute the misalignment between sensor aperture B and the vehicle body. For example, sensor aperture A can be a ranging laser sensor aperture and it sends out multiply beams of light to detect a target. When the light is reflected from the target, sensor aperture B can also detect the reflected light in its video camera and using this information it can compute the misalignment between sensor aperture A and sensor aperture B.

FIG. 12 is a flow chart showing the process when all of the sensors on the vehicle are optical sensors. Each optical device can see targets and the outline of features of the vehicle, such as the hood or truck line. The optical sensors use this vehicle body information to compute the roll, pitch and yaw misalignment angles between the optical sensor frame and the vehicle body frame. These misalignment angles are then used to rotate the sensor target data from each sensor into the vehicle body frame. Like the two cases above, with all of the target data in a common reference frame the processor can fuse data from several sensors into an optimal target track file.

A fourth method is to collocate all of the sensor apertures into one box that is mounted on the vehicle, such as the roof, so that all sensor apertures are always aligned with respect to each other and the only alignment required is the alignment between this sensor aperture box and the vehicle body. This can be performed by using a set of accelerometers in the sensor aperture box and on the vehicle body frame or optically by using a video camera in the sensor aperture box.

FIG. 13 shows the case where all of the sensors are mounted onto one fixed platform. If one of the sensors is an optical sensor then it can be used to align the platform frame to the vehicle body frame as shown above. Once this set of misalignment angles is computed, then all of the target data from all of the sensors can be rotated to the common vehicle body reference frame. As shown above all of the target data is now in one reference frame for computing the optimal target tracks. If none of the sensors are optical, then a set of micro-inertials can be mounted on the common platform and also on the vehicle body. While the vehicle is moving the Kalman filter can now be used to compute the misalignment angles as discussed in the above paragraphs.

The systems described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

FIG. 14 shows a multi-sensor system 20812 that includes different sensors 20816 and 20818 that are both integrally attached to or integrally formed into the substrate 20814. Because the two sensors 20816 and 20818 are integrated onto the same substrate 20814, any forces experienced by sensor 20816 are also experienced by sensor 20818. One type of material that is used for substrate 20814 is invar. Invar is a rigid metal that has been cured with respect to temperature so that its dimensions do not change with fluxuations in temperature. Any rigid material that is resilient to expansion or contraction with temperature changes can be used.

Locating the sensors 20816 and 20818 on the same substrate 20814 simplifies the cost of sensor manufacturing and installation. For example, the two sensors 20816 can be assembled onto the substrate 20814 in a factory prior to being installed on a vehicle. If the two sensors 20816 and 20818 were not mounted on the same substrate 20814, then each sensor would have to be separately mounted on the vehicle and then calibrated to a known alignment with respect to each other. Even if the two sensors were installed correctly, changes in the shape of the vehicle due to wear, temperature, etc. over time could change the initial alignment between the two sensors.

Premounting or prefabricating the sensors 20816 and 20818 on the substrate 20814 prior to installation on a vehicle, prevents these alignment errors. Only the substrate 208 14 of the multi-sensor system 20812 has to be mounted to the vehicle, not the individual sensors 20816 and 20818. This allows the relative position 20820 and alignment between the two sensors 20816 and 20818 to remain the same regardless of how the substrate 20814 is mounted on the vehicle. Wiring is also simplified since only one wiring harness has to be run through the vehicle to the multi-sensor system 20812.

In one example, the sensor 20816 senses an area 20824 and the sensor 20818 senses an area 20822 that are both coincident. One of the sensors may have a wider field of view than the other sensor. There can also be more than two sensors on substrate 20814 and any active or passive sensor that provides object detection or vehicle force measurements can be mounted onto substrate 20814. Some examples of sensors include ultrasonic, Infra-Red (IR), video, radar, and lidar sensors.

Depending on the substrate 20814 and the types of sensors, different mounting techniques can be used. The sensors may be separate components that are glued or bolted onto the substrate 20814. If the multi-sensor system 20812 is an integrated circuit, then the sensors 20816 and 20818 may be integrally fabricated onto a silicon or alternative temperature resilient substrate 20814 using known deposition processes.

In one example, sensor 20814 is a radar or lidar sensor and sensor 20818 is a camera. Combining a video camera sensor with a radar and/or lidar sensor on the substrate 14 provides several advantages. The camera sensor 20818 provides good angle resolution and object identification. The radar or lidar sensor 20816 on the other hand is very effective in identifying range information.

Combining the camera video sensor 20818 with the radar or lidar sensor 20816 on the same substrate 20814 allows more effective correlation of camera angle and identification data with radar or lidar range information. For example, the radar sensor 20814 may only be able to measure angle of an object to within one-half a degree. Because of the limited angle accuracy of the radar angle readings, it may not be possible to determine from the radar reading along if an oncoming vehicle is coming from the same lane of traffic or from an opposite lane of traffic.

The video sensor 20818 may be able to accurately determine the angle of an object to within one-tenth or one-one hundredth of a degree. By correlating the radar information with the camera information, the location of an on-coming vehicle can be determined more accurately.

Do to vibration differences and possible inaccuracies in sensor alignment, it may not be possible, within fractional degrees of accuracy, to correlate information with separately mounted sensors. In other words, if the camera angle varies within plus or minus one degree with respect to the radar angle, then the camera data may not be able to refine the radar measurements.

By mounting the camera sensor 20818 and the radar sensor 20816 to the same substrate 20814, the relative position and alignment between the two sensors remains essentially the same regardless of physical effects on the vehicle. Thus, the camera data can be correlated with radar data to within fractions of a degree of accuracy.

In another example, a first sensor may detect one object out in front of the vehicle. A second sensor located somewhere else on the vehicle may detect two different objects in front of the vehicle. Because of vibrations in different parts of the vehicle, a central processor may not be able to determine which of the two objects detected by the second sensor is associated with the object detected by the first sensor. With the multi-sensor system 20812, measurement errors caused by this vehicle vibration is cancelled since the two sensors 20816 and 20818 effectively experience the same amount of vibration at the same time.

FIG. 14 shows an alternative embodiment where a processor 20826 is mounted to the substrate 20814. Again the processor 20826 can be a standalone component that is rigidly attached to substrate 20814. Alternatively, the processor 20826 is a portion of the same integrated circuit that also contains the circuitry for sensors 20816 and 20818. The processor 20826 can perform signal processing tasks for both sensor 20818 and sensor 20816 and can also handle communication and diagnostics tasks. Tracks for identified objects are sent over connection 20828 to other multi-sensor systems in the vehicle or to a vehicle control system as shown later in FIG. 18.

In previous multi-sensor applications, each sensor was required to send all data back to the same central processing system. This takes additional time and circuitry to send all of the data over a bus. By mounting the processor 20826 in the multi-sensor system 20812, data from both sensor 20816 and sensor 20818 can be processed locally requiring fewer reports to be sent over connection 20828.

Figure 16:
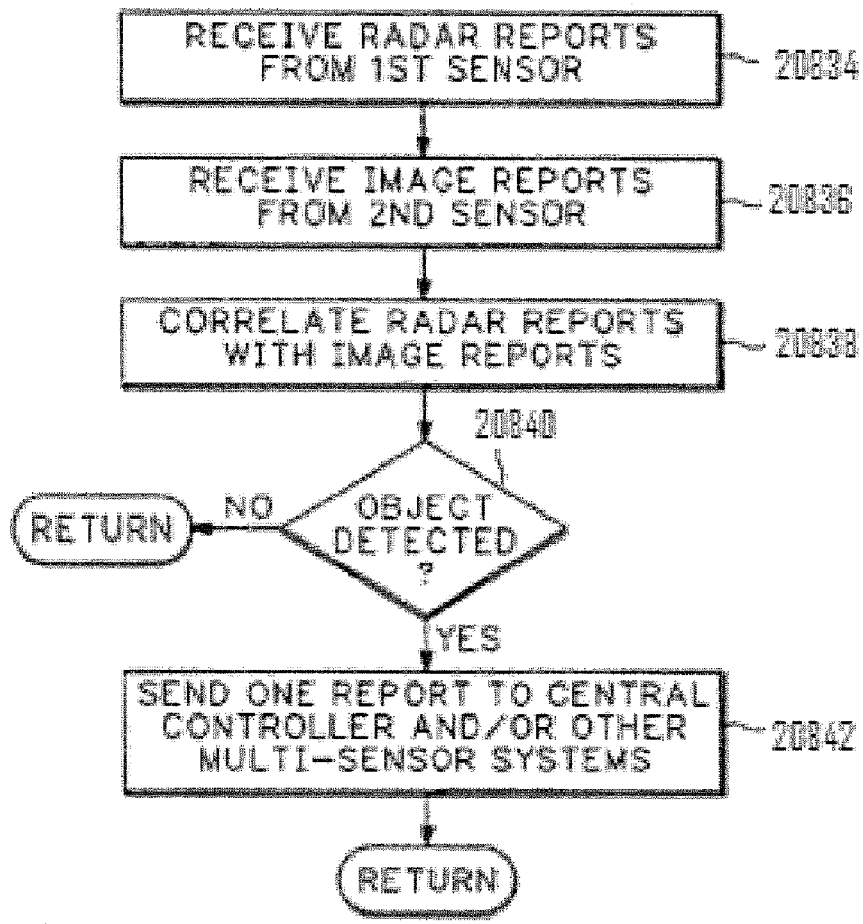
FIG. 16 is a flow diagram showing how the processor in FIG. 15 operates.

Referring to FIG. 16, the processor 20826 in FIG. 14 receives radar reports from the first sensor 20816 in block 20834. The processor 20826 receives image reports from the second sensor 20818 in block 20836. The processor 20826 correlates the different reports in block 20838. Since the relative position of the two sensors 20816 and 20818 are the same and possibly coincident, the processor 20826 does not have to perform as many calculations transforming sensor measurements into common body coordinates for the vehicle.

The correlation may include first determining if the reports actually identify an object in block 20840. The processor 20826 can verify or refine object detection information from one of the sensors with the message reports received from the other sensor. If both sensors do not verify detection of the same object within some degree of certainty, then the processor system 20826 may discard the message reports or continue to analyze additional reports in block 20840.

When an object is detected in block 20840, the processor 20826 only has to send one report in block 20842 representing the information obtained from both sensor 20816 and sensor 20818. This reduces the total amount of data that has to be sent either to a central controller or another multi-sensor system in block 20842.

Figure 17:
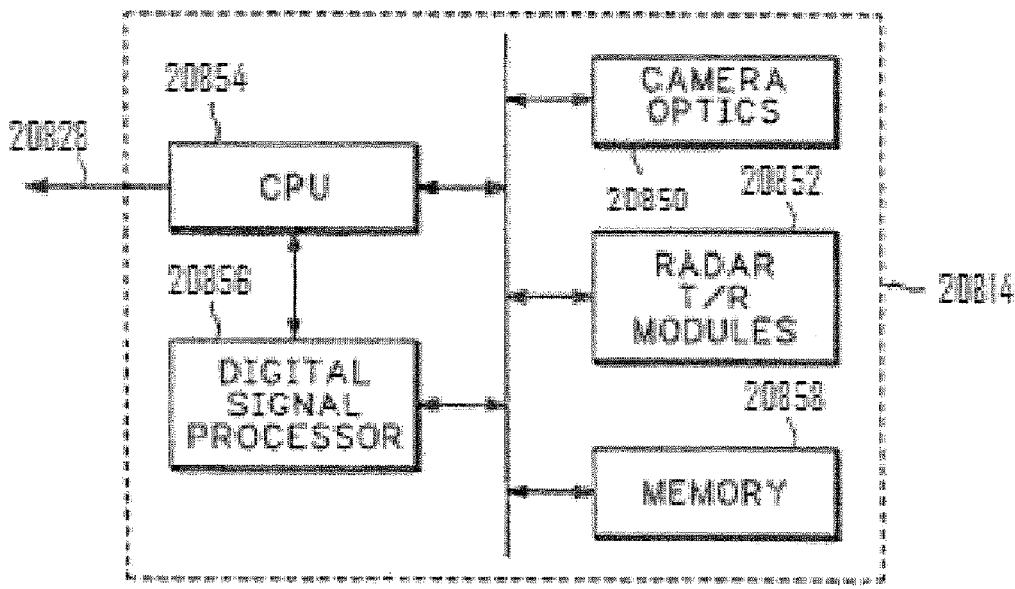
FIG. 17 is detailed diagram showing how different elements in the multi-sensor system are electrically connected together.

FIG. 17 shows in further detail the different devices that may be integrated on the multi-sensor substrate 20814. Camera optics 20850 and radar transmit/receive modules 20852 are each connected to a Central Processing Unit (CPU) 20854 and a digital signal processor 20856. A memory 20858 is used to store sensor data, signal processing applications and other operating system functions. The CPU 20854 is also used for conducting distributed sensor fusion as described in further detail below.

Distributed Sensor Fusion

Figure 18:
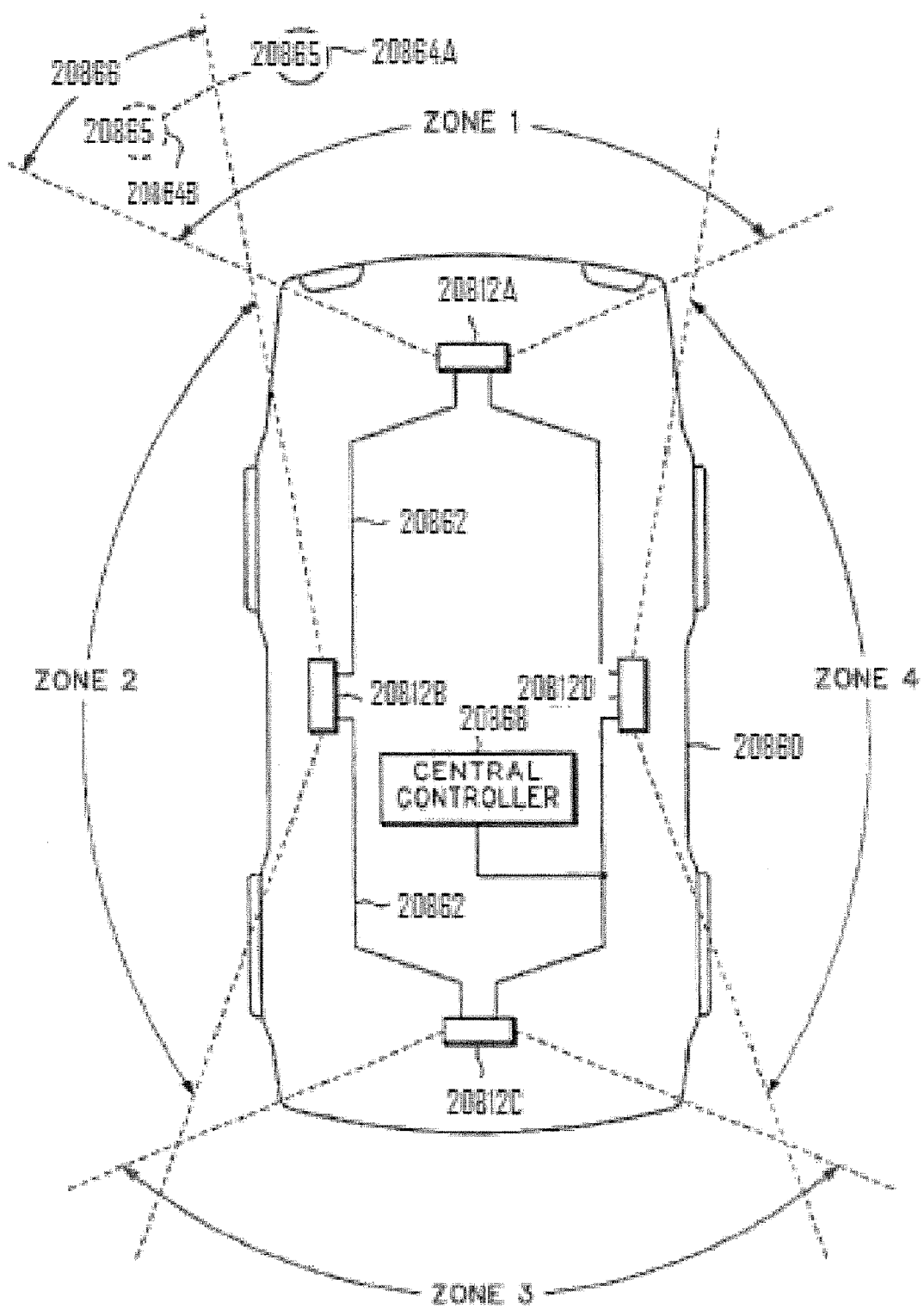
FIG. 18 is a diagram showing how different multi-sensor systems operate together to track objects.

Referring to FIG. 18, different multi-sensor systems 20812A-20812D are used for monitoring different zones around a vehicle 20860. For example, system 20812A monitors zone 1, system 20812B monitors zone 2, system 20812C monitors zone 3 and system 20812D monitors zone 4. The CPU 20854 and digital signal processor 20856 (FIG. 17) in each multi-sensor system 20812A-20812D in combination with the camera and radar sensors identify and track objects autonomously, without having to communicate with a central controller 20868 in vehicle 20860.

Whenever an object is detected, identified and tracked, a track file is created for that object in memory 20858 (FIG. 17). If the object moves to another zone around the vehicle 20860, the multi-sensor system for the zone where the object was previously detected only has to send the track files to the other multi-sensor system associated with the overlapping region.

For example, a bicycle 20865 may be initially detected by multi-sensor system 20812A at location 20864A in zone 1. The multi-sensor system 20812A creates a track file containing position, speed, acceleration, range, angle, heading, etc. for the bike 20865.

As the vehicle 20860 moves, or the bike 20865 moves, or both, the bike 20865 may move into a new position 20864B in an overlapping region 208 66 between zone 1 and zone 2. The multi-sensor system 20812A upon detecting the bike 20865 in the overlapping region 20866 sends the latest track file for the bike 20865 to multi-sensor system 20812B over bus 20862. This allows the multi-sensor system 20812B to start actively tracking bike 20865 using the track information received from multi-sensor system 20812A.

The multi-sensor system 20812A only has to send a few of the latest track files for the common area 20866 over connection 20864 to multi-sensor 20812B in order for system 20812B to maintain a track on bike 208 65. The track files can be exchanged between any of the multi-sensor systems 20812A-20812D. When there are two multi-sensor systems that have overlapping tracks for the same object, the track file with the greatest confidence of accuracy is used for vehicle warning, security, and control operations. There are known algorithms that calculate track files and calculate a degree of confidence in the track file calculations. Therefore, describing these algorithms will not be discussed in further detail.

There may be vibrational effects on the different multi-sensor systems 20812A-20812D. This however does not effect the track calculations generated by the individual multi-sensor systems 20812A-20812D. The only compensation for any vibration may be when the track files are translated into body coordinates when a possible control decision is made by the central controller 208 68.

The connection 20862 can a CAN bus, wireless 802.11 link or any other type of wired or wireless link. The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A sensor alignment system for establishing and maintaining accurate alignment of optical sensors comprising:
   multiple image sensors collocated on a common substrate and mounted on an automotive vehicle for gathering object data around the vehicle using optical information;
   a first micro inertial sensor included with the sensors that measures at least one of rotation rate and acceleration along two or more axes of the sensors for the establishment of a sensor reference frame;
   a second micro inertial sensor mounted on the vehicle that measures at least one of rotation rate and acceleration along two or more axes of the vehicle for the establishment of a vehicle reference frame; and
   a processor determining an amount of misalignment of the sensor reference frame with the vehicle reference frame and aligning sensor target data with the vehicle reference frame according to the amount of misalignment.

2. The system according to claim 1 wherein the image sensors operate as a single sensor.

3. The system according to claim 1 wherein the image sensors collect at least one of raw image information or a complete image.

4. The system according to claim 1 wherein the second micro inertial sensor is also used for at least one of vehicle stability control or braking.

5. The system according to claim 1 wherein the first micro-inertial uses acceleration over time to estimate speed.

6. The system according to claim 1 wherein the accelerometer sense gravity and use the values measured to establish the vehicle reference frame.

7. The system according to claim 1 wherein the amount of misalignment includes a pre-determined value.

8. The system according to claim 1 wherein the multiple sensors have at least one of coincident or largely coincident fields of view.

9. The system according to claim 1 wherein the substrate is a supporting material on which a circuit is formed or fabricated.

10. The system according to claim 1 wherein the multiple sensors are image sensors.

11. The system according to claim 1 wherein the substrate is a supporting material on which multiple sensors are mounted.

12. The system according to claim 1 wherein the sensors are separate components that are bolted, glued or otherwise rigidly attached to the substrate.

13. The system according to claim 1 wherein the object data is used for detecting collision conditions.

14. The system according to claim 1 wherein the substrates are made from material resistant to dimensional changes due to temperature.

15. The system according to claim 1 wherein the sensors have a known physical relationship.

16. The system according to claim 1 wherein the multiple sensors are rigidly mounted to the substrates prior to the substrate being installed in the vehicle.

17. The system according to claim 1 wherein the sensors have an unknown physical relationship and require axis translation or rotation into a common reference frame.

18. The system according to claim 1 wherein the processor is collocated with the sensors and the first micro-inertial sensor.

19. The system according to claim 18 wherein the alignment of the sensor target data to the vehicle reference frame is done at the sensor.

20. The system according to claim 1 wherein the processor is located within a vehicle system processor, which includes the first micro-inertial sensor.

21. The system according to claim 20 wherein the alignment of the sensor target data to the vehicle reference frame is done within the vehicle system processor.

22. The system according to claim 1 wherein multiple sensors for gathering target data around the vehicle are mounted on the vehicle, each with micro-inertial sensors that are used to determine an amount of misalignment between the multiple sensors.

23. The system according to claim 22 wherein each sensor aligns itself to the vehicle reference frame in a distributed process.

24. The system according to claim 22 wherein each sensor is aligned to the vehicle reference frame in a vehicle system processor in a centralized process.

25. The system according to claim 22 wherein only one of the sensors aligns itself to the vehicle reference frame.

26. A multi-sensor system, comprising;
   multiple sensors integrated onto a singular substrate forming a unitary multi-sensor platform that provides a known consistent physical relationship between the multiple sensors,
   a micro inertial sensor included with the sensors that measures rotation rate and acceleration along two or more axes of the sensor for the establishment of a sensor reference frame;
   a processor configured to:
   determine an amount of misalignment of the sensor reference frame with a vehicle body reference frame;
   aligning sensor target data with the vehicle body reference frame according to the amount of misalignment;
   correlate data from the sensors to identify and track objects that may come within a certain vicinity of a vehicle.

27. A multi-sensor system according to claim 26 wherein the processor performs at least one of signal processing, communication or diagnostic tasks for at least two sensors on the substrate.

28. A multi-sensor system according to claim 26 wherein the measurements from the different sensors are translated to a common reference before the different data is correlated.

29. A multi-sensor system according to claim 26 wherein the sensors have a known physical relationship and do not require axis translation or rotation into a common reference frame.

30. A multi-sensor system according to claim 26 wherein the processor correlates data from the multiple sensors and converts the correlated data for detected objects into track files.

31. A multi-sensor system according to claim 26 wherein memory is integrated into the substrate to store sensor data, signal processing applications or other operating system functions.

32. A multi-sensor system according to claim 31 wherein the application is one of lane departure warning, collision avoidance, blind spot detection or adaptive cruise control.

33. A multi-sensor system according to claim 26 wherein one of the sensors is an image sensor and able to determine the angle of an element in the scene to within one-tenth of a degree.

* * * * *